(12) United States Patent
Yamaguchi

(10) Patent No.: US 10,724,705 B2
(45) Date of Patent: Jul. 28, 2020

(54) LIGHT SOURCE APPARATUS AND VEHICULAR HEADLIGHT

(71) Applicant: STANLEY ELECTRIC CO., LTD., Tokyo (JP)

(72) Inventor: Yuta Yamaguchi, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/449,474

(22) Filed: Jun. 24, 2019

(65) Prior Publication Data

US 2019/0390838 A1 Dec. 26, 2019

(30) Foreign Application Priority Data

Jun. 22, 2018 (JP) ................................ 2018-119365

(51) Int. Cl.
| | |
|---|---|
| *F21S 45/70* | (2018.01) |
| *F21S 41/16* | (2018.01) |
| *F21S 41/675* | (2018.01) |
| *F21S 41/25* | (2018.01) |
| *F21S 41/176* | (2018.01) |
| *B60Q 11/00* | (2006.01) |

(52) U.S. Cl.
CPC ............. *F21S 45/70* (2018.01); *B60Q 11/005* (2013.01); *F21S 41/16* (2018.01); *F21S 41/176* (2018.01); *F21S 41/25* (2018.01); *F21S 41/675* (2018.01)

(58) Field of Classification Search
CPC .......... F21S 45/70; F21S 41/675; F21S 41/25; F21S 41/176; F21S 41/16; B60Q 11/005
See application file for complete search history.

(56) References Cited

U.S. PATENT DOCUMENTS

| 10,330,527 B2* | 6/2019 | Fiederling ............... F21S 41/14 |
| 2014/0009952 A1* | 1/2014 | Nomura .................. F21S 41/16 |
| | | 362/509 |

(Continued)

FOREIGN PATENT DOCUMENTS

| JP | 2005-148459 A | 6/2005 |
| JP | 2014-165450 A | 9/2014 |

(Continued)

*Primary Examiner* — Mariceli Santiago
(74) *Attorney, Agent, or Firm* — Xsensus LLP

(57) ABSTRACT

A light source apparatus includes: a laser light source; a fluorescent material plate including a laser beam irradiation region and being capable of emitting light generated by irradiating the laser beam irradiation region with a laser beam; a light scanning mechanism capable of scanning the laser beam irradiation region with the laser beam; a first transparent conductive film pattern disposed on the fluorescent material plate in the laser beam irradiation region; a second transparent conductive film pattern disposed on the fluorescent material plate outside the laser beam irradiation region and connected to the first transparent conductive film pattern to constitute a continuous series connection wiring; and an electric circuit electrically connected to the second transparent conductive film pattern, detect a change in a resistance value of the series connection wiring, and function to stop the driving of the laser light source when the resistance value falls outside a predetermined range.

17 Claims, 4 Drawing Sheets

(56) References Cited

U.S. PATENT DOCUMENTS

2014/0334167 A1* 11/2014 Tiefenbacher ....... B60Q 1/1423
362/465
2019/0390831 A1* 12/2019 Yamaguchi ............. F21S 45/70

FOREIGN PATENT DOCUMENTS

| JP | 2017-056762 A | | 3/2017 |
| JP | 2020015355 A | * | 1/2020 |

* cited by examiner

LIGHT SOURCE APPARATUS AND VEHICULAR HEADLIGHT

This application claims the priority benefit under 35 U.S.C. § 119 of Japanese Patent Application No. 2018-119365 filed on Jun. 22, 2018, which is hereby incorporated in its entirety by reference.

TECHNICAL FIELD

The present invention relates to a vehicular headlight, and more particularly, to a vehicular headlight having a laser light source, a light scanning mechanism, and a fluorescent material plate.

BACKGROUND ART

A known light source has a fluorescent material plate supported by a supporting member. The fluorescent material plate is irradiated with light emitted from a semiconductor laser to obtain white light. If the fluorescent material plate peels off or the fluorescent material plate is detached from the support member due to vibration or shock, there is a risk that the laser light directly travels to the outside. In a vehicular headlamp or the like, a driver of an oncoming vehicle may be irradiated with laser light in this case. To cope with these problems, there are also safety standards for laser products.

As shown in FIG. 3A, it is proposed that a circuit pattern substrate 110 having a window is disposed above a semiconductor laser 105, a fluorescent material plate 111 having a reflective electrode 108 surrounding an irradiation region with laser light having passed through the window of the circuit pattern substrate 110 is disposed on (above) the circuit pattern substrate 110, and the fluorescent material plate 111 is irradiated with the laser light from the semiconductor laser 105 through the opening of the reflective electrode 108. The driving current for the semiconductor laser 105 is supplied from a driving circuit including the reflective electrode 108 on the fluorescent material plate 111 as a part of wiring. When the fluorescent material plate 111 is detached from the circuit pattern substrate 110 due to some reasons, the wiring of the driving circuit is disconnected, so that the operation of the semiconductor laser 105 is stopped (see, for example, Japanese Patent Application Laid-Open No. 2014-165450).

Another known laser lamp unit has a configuration in which light from a laser element is condensed by a lens, and the laser light incident on and transmitted through a fluorescent material and fluorescence by the fluorescent material are combined together to generate white light.

Further proposed is a laser lamp unit of a type in which laser light is scanned by a mirror or the like to selectively irradiate light in accordance with the position of an oncoming vehicle (see, for example, Japanese Patent Application Laid-Open No. 2017-056762).

As shown in FIG. 3B, for example, there has been a proposal for such a lamp unit in which right and left longitudinal centers of a rectangular central portion 121 are coupled to an intermediate portion 123 by torsion bars 122*a* and 122*b*, and the upper and lower lateral centers of the intermediate portion 123 are coupled to an outer portion 125 by torsion bars 124*a* and 124*b*. Grooves G1*a* and G1*b* are formed between the central portion 121 and the intermediate portion 123, and grooves 124*a* and 124*b* are formed between the intermediate portion 123 and the outer portion 125. A mirror mechanism capable of scanning the reflected light in the two-dimensional manner is formed by disposing a mirror plane M in the central portion 121 and further providing a drive mechanism such as a piezoelectric element to the torsion bar portions 122 and 124 (see, for example, Japanese Patent Application Laid-Open No. 2005-148459).

In a laser headlight of the type that scans laser light, laser light having a high intensity is scanned over a fluorescent material plate. Since the light emitted from the fluorescent material plate by the irradiation of the laser light travels in all directions, and the laser light traveling in the fluorescent material is also scattered by the fluorescent material, the intensity per unit area of the emitted light becomes low, and thus eye safety is achieved.

When the laser light scans the surface of the fluorescent material plate, a temperature distribution is generated in the fluorescent material plate. The headlight is exposed to the outside and is also affected by the outside air temperature. For example, a temperature change of −40° C. to +100° C. or higher is expected for the headlight. A mechanical external force such as strain is generated due to the temperature change. The headlight also receives external forces such as vibrations, shocks, etc. from the vehicle body. Due to the influence of these external forces and the like, the fluorescent material plate may not only be detached therefrom, but may also be damaged or broken to generate minute cracks, breakage, and the like.

If a defect such as a minute crack occurs in the fluorescent material plate, there is a possibility that the laser light is directly projected to the outside. In a mechanism for detecting an abnormality of the entire fluorescent material plate such as detachment of the fluorescent material plate, a minute crack or the like cannot be detected, and there may still be a possible risk that eye safety of a person in front of the headlight is impaired.

SUMMARY

The present invention was devised in view of these and other problems and features in association with the conventional art. According to an aspect of the present invention, there can be provided a light source apparatus capable of detecting, even when a small defect such as a minute crack occurs in a fluorescent material plate, such a defect to take a safety measure.

According to another aspect of the present invention, a light source apparatus can include: a laser light source capable of emitting a laser beam; a fluorescent material plate including a laser beam irradiation region and being capable of emitting light that is generated by irradiating the laser beam irradiation region with a laser beam to convert the light in wavelength in response to the laser beam irradiation; a light scanning mechanism capable of scanning the laser beam irradiation region with the laser beam; a first transparent conductive film pattern disposed on the fluorescent material plate in the laser beam irradiation region; a second transparent conductive film pattern disposed on the fluorescent material plate outside the laser beam irradiation region and connected to the first transparent conductive film pattern to constitute a continuous series connection wiring; and an electric circuit configured to be electrically connected to the second transparent conductive film pattern, detect a change in a resistance value of the series connection wiring, and function to stop the driving of the laser light source when the resistance value falls outside a predetermined range.

In the light source apparatus according to the foregoing aspect, the first transparent conductive film pattern may include a line-and-space pattern constituted by parallel line sections with a predetermined space between adjacent parallel line sections, the line-and-space pattern being disposed and distributed in the laser beam irradiation region.

Furthermore, in the light source apparatus according to any of the foregoing aspects, the line sections of the first transparent conductive film pattern may extend in a first direction, and the light scanning mechanism may scan in a scanning direction along a second direction crossing the first direction. Furthermore, the laser light source may emit the laser beam forming an elliptical spot with a major axis and a miner axis in the laser beam irradiation region with the miner axis extending in the first direction.

In the light source apparatus according to any one of the foregoing aspects, when a width of the parallel line section is denoted by L and a distance of the space between the adjacent parallel line sections is denoted by S, a value of (2L+S) may set to a predetermined value or less. In particular, the predetermined value may be a value that does not cause an unsafety exposure of light.

According to another aspect of the present invention, a vehicular headlamp comprising: the light source apparatus according to any one of the foregoing aspects; and a projection lens configured to project light emitted from the fluorescent material plate forward.

The light source apparatus according to the present invention adopts the arrangement of the transparent conductive film patterns such that the first transparent conductive film pattern is cut even by minute cracks. Thus, laser light of dangerous intensity can be prevented from being projected.

BRIEF DESCRIPTION OF DRAWINGS

These and other characteristics, features, and advantages of the present invention will become clear from the following description with reference to the accompanying drawings, wherein.

DESCRIPTION OF EXEMPLARY EMBODIMENTS

Figure 3A:
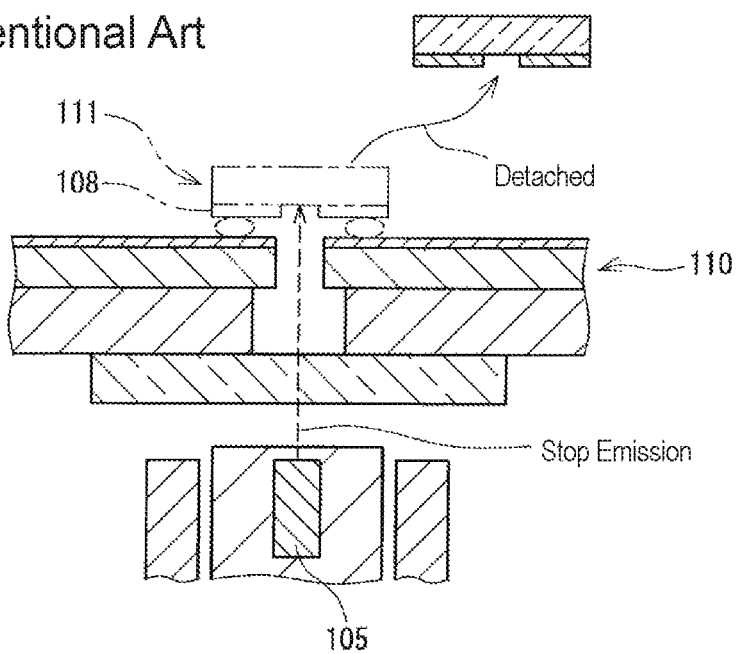
FIG. 3A is a schematic cross-sectional view of a conventional laser light source system in which the power supply to a laser light source is cut off when the fluorescent material plate is detached due to an external force or the like, and FIG. 3B is a plan view schematically illustrating a conventional light scanning mechanism which is supported by a torsion bar and has a mirror surface capable of two-dimensional scanning.

In the apparatus in the conventional art illustrated in FIG. 3A, when the fluorescent material plate 111 is detached, the power supply wiring is disconnected, so that an abnormality can be detected. However, even if a minute crack occurs in the fluorescent material plate, the abnormality cannot be detected if the fluorescent material plate itself is still bonded to the support substrate.

The present inventor has investigated the formation of wiring of a fine pitch on a fluorescent material plate such that any wiring is disconnected if a minute crack occurs. For example, parallel wirings (parallel line sections of the first pattern) having a fine pitch are formed and distributed in a laser beam irradiation region to constitute a line-and-space pattern. The sensitivity for detecting the abnormality of the fluorescent material plate with a constant resolution is set in the laser beam irradiation region by parallel wirings with a constant pitch.

A wiring (second pattern) for connecting the parallel wirings in the laser beam irradiation region is formed outside the laser beam irradiation region. Hereinafter, the first pattern and the second pattern may be collectively referred to as a wiring. When parallel wirings are connected in series to form a single wiring, an abnormality can be detected by a single continuous wiring.

At least the wiring of the first pattern is formed from a transparent conductive film of such as indium tin oxide (ITO) or indium zinc oxide (IZO), and the wiring in the laser beam irradiation region is made to transmit light, thereby suppressing a decrease in the intensity of the output light.

If the wiring of the second pattern is also formed from the same transparent conductive film as the wiring of the first pattern, the wiring of the first pattern and the wiring of the second pattern can be formed by the same manufacturing process. It is preferable that electrodes having excellent functions such as connectivity are connected to both ends of the single continuous wiring.

Figure 1A:
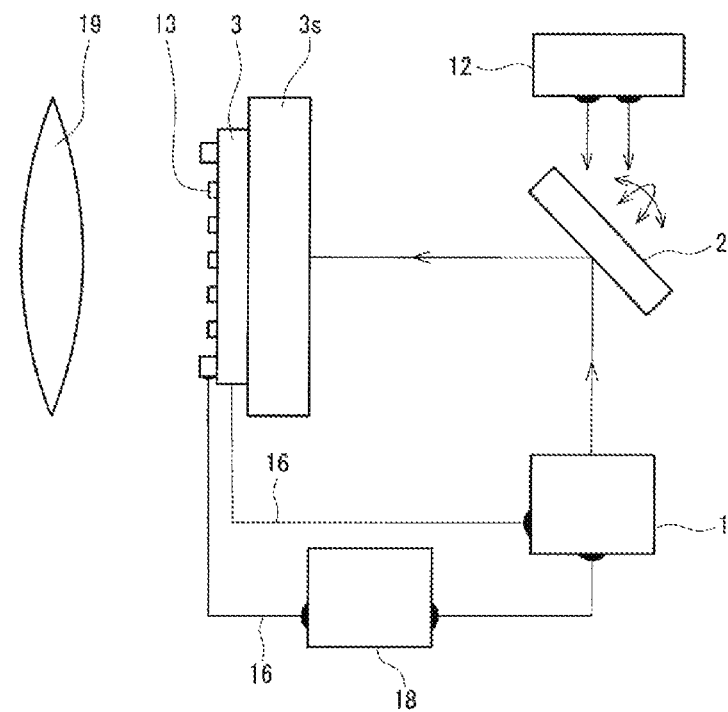
FIGS. 1A and 1B are a cross-sectional view illustrating a main configuration of a vehicular headlight according to an exemplary embodiment of the present invention, and a plan view illustrating an example of a shape of a transparent conductive film on a fluorescent material plate, respectively.
Figure 3B:
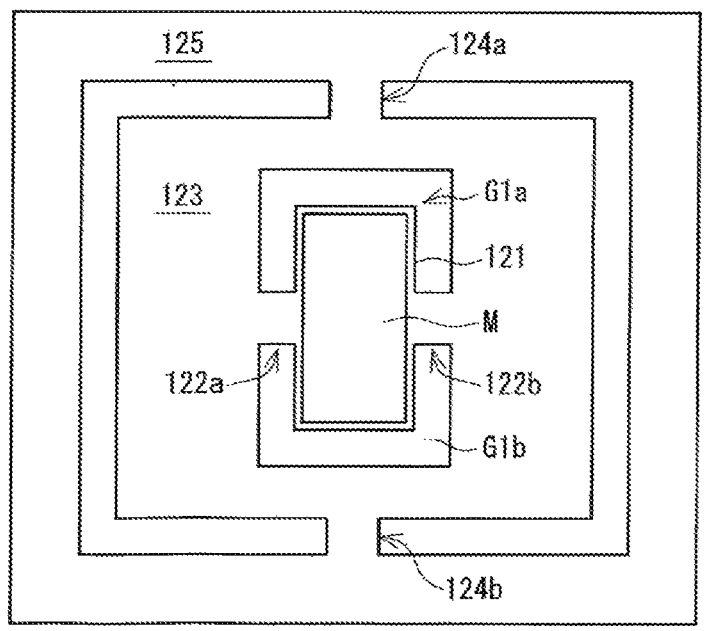

FIG. 1A is a cross-sectional view schematically illustrating a configuration of a laser-light-scanning type vehicular headlight according to an exemplary embodiment of the present invention. The laser light source 1 is, for example, a laser using a (GaInAl)N-based semiconductor, and emits blue light beams. The laser beam has an elliptical cross-sectional shape. The light scanning mechanism 2 has, for example, a mirror mechanism capable of two-dimensional scanning as illustrated in FIG. 3B, and a control device 12 can control the manner in which the two-dimensional scanning is performed.

The fluorescent material plate 3 is a layer formed of a material that receives high energy light and emits fluorescence (e.g., yellow fluorescence) of which wavelength has been converted, and is disposed on a support substrate 3s, such as quartz substrate, that transmits high energy light. On the surface thereof, a transparent conductive film pattern 13 is formed. It is also possible for the fluorescent material plate to emit not only yellow light but also two to three colors of light. The scanning by the light scanning mechanism 2 can cause the laser beam to be irradiated to an arbitrary point in the laser beam irradiation region of the fluorescent material plate 3. Typically, a two-dimensional scanning is performed along a parallel pattern at a certain pitch.

Figure 1B:
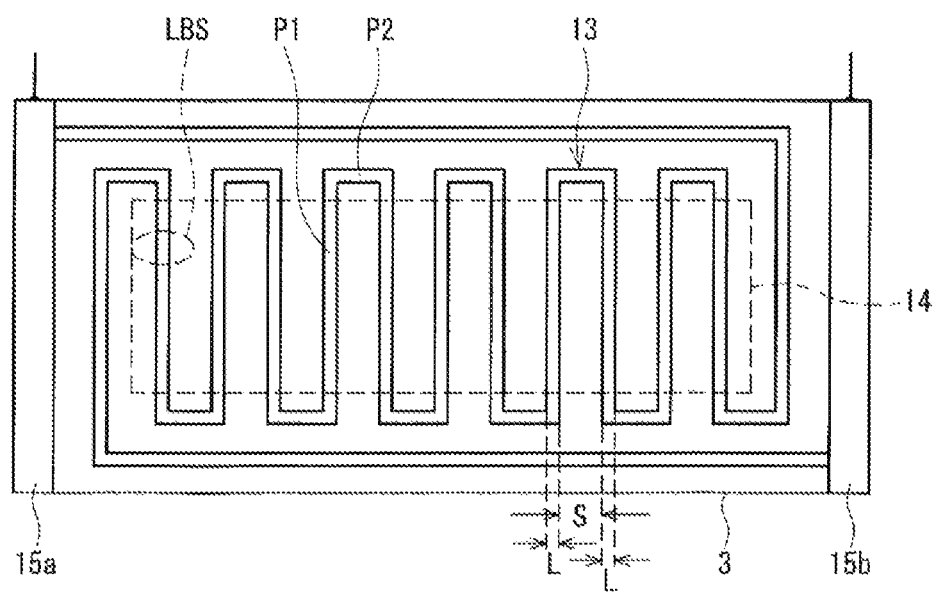

FIG. 1B schematically illustrates a wiring pattern formed on the surface of the fluorescent material plate 3. The fluorescent material plate 3 has, for example, a thickness of about 30 μm, and an area with a height of 8 mm and a width of about 18 mm. The wiring pattern 13 of the transparent conductive film is a continuous wiring extending in and out of the laser beam irradiation region. In the laser beam irradiation region 14, the wiring pattern 13 forms parallel wirings at a certain pitch. Outside the laser beam irradiation region 14, the parallel wirings are connected by a transparent conductive film pattern to form a single continuous wiring, and both ends are connected to electrodes 15*a* and 15*b* formed of a multilayer structure of gold/platinum or the like, respectively. Let L be the wiring (line) width in the parallel wiring portion, and S be the wiring interval (space). If a minute crack occurs only in the space S portion, the wiring is not disconnected and the minute crack cannot be detected. If a minute crack crosses any of the parallel wirings (causing disconnection), the current does not flow, and the minute crack is obviously detected. The value of (2L+S) including the space S and the line width 2L on both sides serves as an indication for detecting a minute crack. If the minute crack crosses any of the parallel wirings (causing disconnection), the current does not flow, and so the minute crack can be detected. Even if a crack extends to the half (L/2) of the adjacent parallel wirings P1, conductivity remains in the remaining parallel wirings having a width of L/2. If the crack width is equal to the value of (2L+S), any of the wirings is disconnected, and thus the resistance value becomes infinite. Thus, the value of (2L+S) including the space S and the line width 2L on both sides serves as an index for detecting a minute crack.

The laser beam spot LBS has a dimension of, for example, a major axis of 350 μm and a minor axis of about 40 μm. The pitch of the parallel wirings is set to a dimension that allows a to-be-detected minute crack to be detected. The major axis direction of the laser beam spot and the extending direction of the parallel wiring are arranged so as to be substantially orthogonal to each other (see FIG. 2A). Depending on the intensity of the laser beam to be irradiated, the pitch of the parallel wirings is set to, for example, several μm to several tens of μm (as specific example, 27 μm).

The parallel wirings are scanned with an elliptical laser beam spot. The elliptical laser beam spot is moved in the elliptical major axis direction to achieve high resolution. The major axis direction of the laser beam spot LBS and the extension direction of the parallel wiring will be discussed. The exposure amount of a laser beam spot when the laser beam spot passes over the crack or the like can be considered as a safety index, meaning that the light amount through the crack or the like is considered as an index of light amount that an object receives (for example, an oncoming driver receives).

Figure 2A:
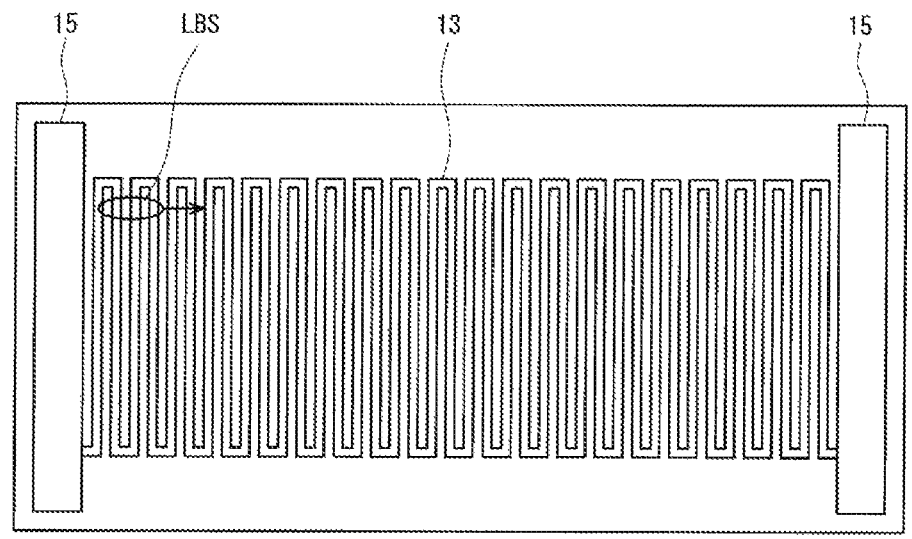
FIG. 2A is a schematic plan view illustrating a transparent conductive film pattern and a scanning direction of a laser spot according to an exemplary embodiment.
Figure 2B:
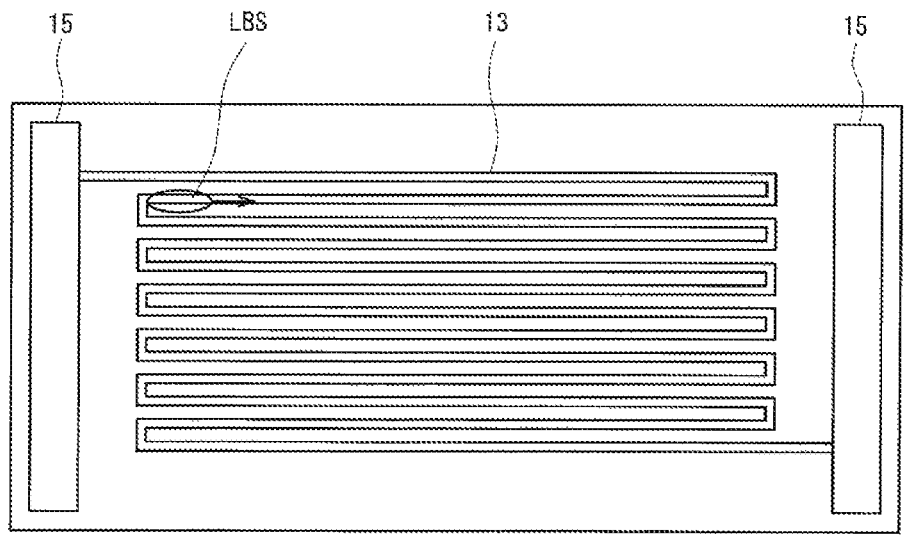
FIG. 2B is a schematic plan view illustrating a transparent conductive film pattern and a scanning direction of a laser spot according to a comparative example.

FIG. 2A shows a setting in which the extension direction of the parallel wiring and the major axis direction of the LBS are orthogonal to each other, and FIG. 2B shows a setting in which the extension direction of the parallel wiring and the major axis direction of the LBS are parallel to each other. Let the wiring (line) width be L and the inter-wiring distance (space) be S.

In this case, the inventor has conducted a simulation in which a laser beam spot is elongated in the horizontal direction (as indicated by LBS in the drawings) and is moved horizontally (along its major axis direction) over a virtual crack with a rectangular shape elongated in the horizontal direction or vertical direction, and an exposure amount of light through such a crack is calculated under conditions in which a laser output was 2.65 W, a scanning speed was 19 Hz along a horizontal axis and 120 Hz along a vertical axis, and a laser spot size was 0.35 mm in the major axis and 0.04 mm in the minor axis. The evaluation was done on the basis of a threshold for the (2L+S) value when the exposure amount of light becomes equal to or less than a predetermined value (as determined in accordance with IEC60825-1, called as class 1 of the minor axis length), meaning that the amount of light through a crack having a size equal to or less than the threshold is safe for a driver's eye and thus the (2L+S) value should be designed to have a size equal to or less than the threshold for detecting a crack having such a size.

As a result of the simulations, the value of (2L+S) when the exposure amount becomes equal to or less than the predetermined amount was 27 μm or less in the case of FIG. 2A, and was equal to or less than 2.4 μm in the case of FIG. 2B. That is, in the arrangement of FIG. 2A according to the present invention, the scale can be made 10 times or more as large as that of the wiring in the arrangement of FIG. 2B, and the degree of difficulty in forming the wiring can be greatly improved, resulting in a cost merit. When the area of the transparent conductive film is reduced, loss of light intensity due to absorption by the transparent conductive film can also be reduced.

Figure 4:
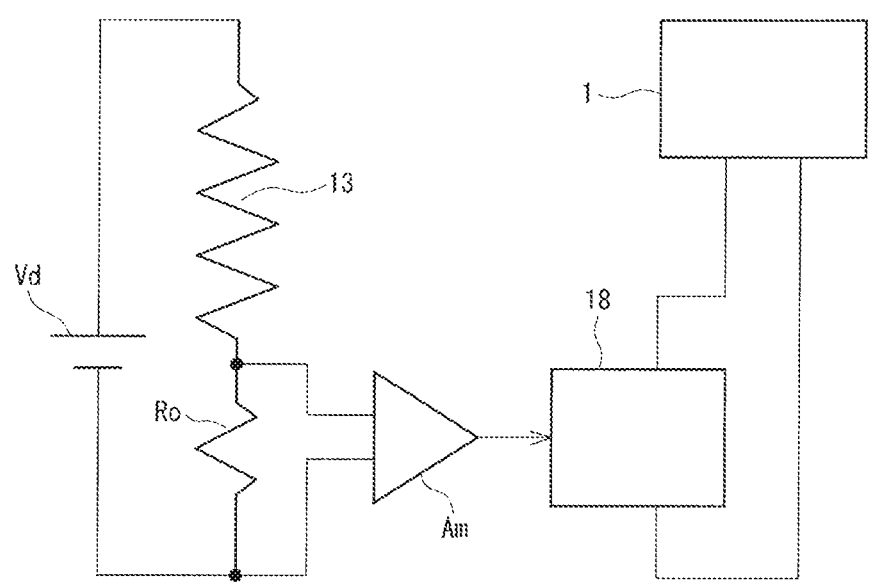
FIG. 4 is a circuit diagram showing another exemplary embodiment.

A configuration has been described in which a part of the wiring connecting the laser light source 1 to the driving power source 18 is a detection circuit including the transparent conductive film pattern 13. The detection circuit may be separated from the power supply wiring of the laser light source 1. For example, as shown in FIG. 4, the laser light source 1 is driven by being directly connected to the power source 18 without interposing a detection circuit therebetween, while a reference resistor R0 is connected in series to the detection pattern 13 to constantly supply a current from a power source Vd. The voltage drop due to the reference resistor R0 is detected by an amplifier Am to control the power supply 18. If the detected voltage is within the predetermined range, the pattern 13 can be judged to be normal, so that the power supply 18 can be turned on. When the pattern 13 is disconnected due to some drawbacks, the detected voltage becomes zero, so that the power supply Vd is turned off to prevent the laser light from being emitted. As in the above-described embodiment, the safety of the driver of an oncoming vehicle and the like can be ensured.

Examples of the light source apparatus according to the present invention may include general-purpose light sources, and light sources for vehicular headlights, vehicular lighting units, etc.

It will be apparent to those skilled in the art that various modifications and variations can be made in the present invention without departing from the spirit or scope of the present invention. Thus, it is intended that the present invention cover the modifications and variations of the present invention provided they come within the scope of the appended claims and their equivalents. All related art references described above are hereby incorporated in their entirety by reference.

What is claimed is:

1. A light source apparatus comprising:
   a laser light source capable of emitting a laser beam;
   a fluorescent material plate including a laser beam irradiation region and being capable of emitting light that is generated by irradiating the laser beam irradiation region with a laser beam to convert the light in wavelength in response to the laser beam irradiation;
   a light scanning mechanism capable of scanning the laser beam irradiation region with the laser beam;
   a first transparent conductive film pattern disposed on the fluorescent material plate in the laser beam irradiation region;
   a second transparent conductive film pattern disposed on the fluorescent material plate outside the laser beam irradiation region and connected to the first transparent conductive film pattern to constitute a continuous series connection wiring; and an electric circuit configured to be electrically connected to the second transparent conductive film pattern, detect a change in a resistance value of the series connection wiring, and function to stop driving of the laser light source when the resistance value falls outside a predetermined range.

2. The light source apparatus according to claim 1, wherein the first transparent conductive film pattern includes a line-and-space pattern constituted by parallel line sections with a predetermined space between adjacent parallel line sections, the line-and-space pattern being disposed and distributed in the laser beam irradiation region.

3. The light source apparatus according to claim 1, wherein the first transparent conductive film pattern includes a pattern constituted by line sections, the line sections of the first transparent conductive film pattern extend in a first direction, and the light scanning mechanism scans in a scanning direction along a second direction crossing the first direction.

4. The light source apparatus according to claim 2, wherein the line sections of the first transparent conductive film pattern extend in a first direction, and the light scanning mechanism scans in a scanning direction along a second direction crossing the first direction.

5. The light source apparatus according to claim 3, wherein the laser light source emits the laser beam forming an elliptical spot with a major axis and a miner axis in the laser beam irradiation region with the miner axis extending in the first direction.

6. The light source apparatus according to claim 4, wherein the laser light source emits the laser beam forming an elliptical spot with a major axis and a miner axis in the laser beam irradiation region with the miner axis extending in the first direction.

7. The light source apparatus according to claim 2, wherein when a width of the parallel line section is denoted by L and a distance of the space between the adjacent parallel line sections is denoted by S, a value of (2L+S) is set to a predetermined value or less.

8. The light source apparatus according to claim 4, wherein when a width of the parallel line section is denoted by L and a distance of the space between the adjacent parallel line sections is denoted by S, a value of (2L+S) is set to a predetermined value or less.

9. The light source apparatus according to claim 6, wherein when a width of the parallel line section is denoted by L and a distance of the space between the adjacent parallel line sections is denoted by S, a value of (2L+S) is set to a predetermined value or less.

10. A vehicular headlamp comprising:

the light source apparatus according to claim 1; and a projection lens configured to project light emitted from the fluorescent material plate forward.

11. The vehicular headlamp according to claim 10, wherein the first transparent conductive film pattern includes a line-and-space pattern constituted by parallel line sections with a predetermined space between adjacent parallel line sections, the line-and-space pattern being disposed and distributed in the laser beam irradiation region.

12. The vehicular headlamp according to claim 10, wherein the first transparent conductive film pattern includes a pattern constituted by line sections, the line sections of the first transparent conductive film pattern extend in a first direction, and the light scanning mechanism scans in a scanning direction along a second direction crossing the first direction.

13. The vehicular headlamp according to claim 11, wherein the line sections of the first transparent conductive film pattern extend in a first direction, and the light scanning mechanism scans in a scanning direction along a second direction crossing the first direction.

14. The vehicular headlamp according to claim 12, wherein the laser light source emits the laser beam forming an elliptical spot with a major axis and a miner axis in the laser beam irradiation region with the miner axis extending in the first direction.

15. The vehicular headlamp according to claim 13, wherein the laser light source emits the laser beam forming an elliptical spot with a major axis and a miner axis in the laser beam irradiation region with the miner axis extending in the first direction.

16. The vehicular headlamp according to claim 11, wherein when a width of the parallel line section is denoted by L and a distance of the space between the adjacent parallel line sections is denoted by S, a value of (2L+S) is set to a predetermined value or less.

17. The vehicular headlamp according to claim 13, wherein when a width of the parallel line section is denoted by L and a distance of the space between the adjacent parallel line sections is denoted by S, a value of (2L+S) is set to a predetermined value or less.

* * * * *